United States Patent [19]

Delvaux et al.

[11] Patent Number: 4,812,204
[45] Date of Patent: Mar. 14, 1989

[54] PROCESS FOR OBTAINING BORIC ACID TREATED ASBESTOS FIBER

[75] Inventors: Pierre Delvaux, Bromptonville; Normand Lesmerises, Rock Forest, both of Canada

[73] Assignee: Ceram-Sna, Inc., Sherbrooke, Canada

[21] Appl. No.: 77,394

[22] Filed: Jul. 24, 1987

[51] Int. Cl.$^4$ .................. C03B 37/00; D21H 5/18; C04B 14/40
[52] U.S. Cl. ............................. 162/3; 162/153; 162/154; 423/167; 423/331
[58] Field of Search .................. 162/1, 3, 153–155, 162/145; 423/167, 331

[56] References Cited

U.S. PATENT DOCUMENTS

| | | | |
|---|---|---|---|
| 3,184,288 | 5/1965 | Louis de Lisle | 162/3 |
| 3,410,751 | 11/1968 | Battista | 162/3 |
| 3,458,393 | 7/1969 | Battista | 162/3 |
| 3,895,997 | 7/1975 | Haywood | 162/145 |
| 4,035,312 | 7/1977 | Banks | 252/70 |
| 4,112,188 | 9/1978 | Dahms | 210/508 |
| 4,180,433 | 12/1979 | Glass et al. | 162/3 |
| 4,226,821 | 10/1980 | Ishikawa et al. | 264/126 |
| 4,303,553 | 12/1981 | Aoki et al. | 423/331 |

Primary Examiner—David L. Lacey
Assistant Examiner—K. M. Hastings
Attorney, Agent, or Firm—Cushman, Darby & Cushman

[57] ABSTRACT

The invention relates to novel borated asbestos fibers which possess improved filtration properties.

2 Claims, No Drawings

PROCESS FOR OBTAINING BORIC ACID TREATED ASBESTOS FIBER

BACKGROUND OF THE INVENTION

This invention relates to a novel modified asbestos fibers particularly suitable for improving the filtration properties of asbestos fibers, and, more particularly, to a chemically modified asbestos fiber that is particularly adapted for processes involving fast filtering asbestos-cement slurries; and an improvement in the method of producing asbestos-reinforced cement products which allows production of such products at a much greater rate than previously possible.

DESCRIPTION OF THE PRIOR ART

Asbestos fibers have several unusual physical and chemical properties which make them particularly useful. For example, asbestos can be woven into cloth to produce a fabric which has unusual heat and corrosion resistance, or added to cement, plastics, and other binders to improve the end product's strength, stiffness, and resistance to heat, chemical corrosion and other environmental hazards. Asbestos fibers also are resistant to moisture, mildew and vermin, and are effective electrical insulators.

Asbestos fibers are processed into marketable goods by using either the "wet" or "dry" processes, both of which involve filtration methods by which a liquid, i.e., water, is withdrawn from a mass of ingredients containing the asbestos fibers.

In the "wet" process, which is used for the making of cement, an aqueous slurry of asbestos fibers, cement with or without silica (sand), is first formed, then filtered so as to collect the dispersed solids of the slurry while removing the accumulated water. As this collected mass builds up during processing on the filter element, the rate of filtration greatly decreases, making it impractical to form structures having large thicknesses at production rates required by a commercially practical operation. In the "dry" process, the three major ingredients are mixed with a small amount of water and processed into the desired final shape.

The filtration properties of asbestos fibers, and particularly chrysotile fibers, by far the most available and popular asbestos fiber, can differ substantially with the particular source or mine location, as well as by type, grade and consistency. These properties can be a significant factor when choosing a particular fiber or fiber blend for a specific manufacturing process, particularly the processes used for the production of asbestos-cement pipe, sheet and board products.

The prior art has made many efforts to increase the filtration rate of asbestos fibers. Some of these have involved thermal treatment of the fiber, the application of several chemical coatings to the fibers; the use of organic coagulating agents and inorganic salt solutions; and spraying the fibers in sodium silicate solutions. However, none of these processes have been completely satisfactory for a variety of reasons.

For example, a silicate spray treatment of the asbestos fibers, such as that disclosed by U.S. Pat. Nos. 3,173,831 and 3,715,230, will increase the filtration rate, but weaken the resulting asbestos product by impairing the strength imparting characteristics of the fibers as the result of the treatment. The addition of anionic sulfonated dispersants such as those described in U.S. Pat. Nos. 3,715,230, 3,891,498 and 3,957,571, have been shown to improve the filtration properties while not weakening the strength of the products made from the treated fibers. However, due to the tacky characteristics of these chemicals, manufacturing problems develop long before the theoretical maximum amount is reached, thus substituting one problem for another. The inclusion of certain phosphates, as disclosed by U.S. Pat. Nos. 3,535,150 and 3,957,571 are also slightly useful in improving the filtration characteristics of the asbestos fiber without greatly reducing the strength of the subsequently produced asbestos containing products.

Accordingly, it is an object of the invention to discover an improved process for improving the filtration characteristics of asbestos fibers.

It is another object of the invention to produce an improved modified asbestos fiber which is particularly adapted for processes involving fast filtering asbestos cement slurries.

It is still another object of the invention to find a process which greatly reduces the time required for the filtration of asbestos fibers used in the production of asbestos-cement articles.

It is still another object of the invention to produce an asbestos reinforced cement pipe of high quality.

SUMMARY OF THE INVENTION

In accordance with the present invention there is now provided a novel chrysotile asbestos derivative which is particularly adapted to improve the filtration or drainage characteristics of asbestos fibers.

More specifically, the novel chrysotile asbestos fiber of the present invention is a borated chrysotile asbestos fiber characterized by a boron content of from 0.05 to 5.0% by weight, with a preferred range of 0.2 to 0.4% by weight.

Also, in accordance with the present invention, there is provided a method which comprises mixing asbestos fibers and boric acid and heating the mixture to a temperature within the range of from 100° to 350° C. for a period of from 0.05 to 2 hours whereby a bond between the boric acid and parts of the asbestos fibers is formed resulting in a novel borated asbestos fiber. Preferably, the heating is carried out at a range of from 180° to 200° C. for a period of time of from 5 to 15 minutes.

The present invention also provides a novel cementitious composition containing novel borated asbestos fibers characterized in that the boron content of the asbestos fibers is from 0.05 to 5.0% by weight of the asbestos fibers.

Finally, also within the scope of the present invention, there is provided a process for preparing an improved water-laid cement product wherein the improvement consists of incorporating borated asbestos fibers having a boron content of from 0.05 to 5.0% by weight to an aqueous slurry of hydraulic cement and silica and filtering the resulting slurry.

DETAILED DESCRIPTION OF THE INVENTION

More particularly the invention comprises dry mixing boric acid and asbestos fibers and heating the homogeneous mixture thus obtained. The novel borated asbestos fiber is characterized by its ability to improve the filtration time of water-laid cement products.

Asbestos Fibers

The asbestos fibers treated by the present invention can include chrysotile, crocidolite, amosite or anthophyllite asbestos. Chrysotile, being the most abundant type of asbestos, is the preferred material for treatment by the present invention. The physical form of asbestos treated includes fibrous mineral bundles of fine crystalline fibers or individual fibers. Preferably the asbestos is in the form of bundles of crystalline fibers. Fibers of any length can be used in accordance with the present invention with asbestos fibers of a length of Grade 3 to 7 being preferred.

Boric Acid

The boric acid used in accordance with the present invention is solid boric acid powder, technical grade. The amount of boric acid varies from 2.86 to 286 gr per kilo of asbestos fibers. The mixing of the boric acid and asbestos fibers is carried in an ordinary mixer or a rotary mixer. The mixing time varies form 1 to 10 minutes.

Heating

The homogeneous mixture of boric acid-asbestos fibers is then transferred to an oven heated to a temperature of from 100° to 350° C. with a residence time of the mixture in the oven of from 0.05 to 2 hours. After cooling, the borated asbestos fibers obtained are ready for use or for bagging for subsequent use. Preferably, the oven is equipped with a screw conveyor.

Borated asbestos cement

The novel borated asbestos fiber of the present invention are particularly well suited for use in the production of water-laid cement-asbestos products by reason of providing a considerably improved water filtration rate. In the production of water-laid cement-asbestos products an aqueous slurry is formed from a mixture of hydraulic cement, with or without silica and borated asbestos fibers, and a water-laid product is formed from the aqueous cement-borated asbestos fiber slurry by filtration or draining the water therefrom. A water-laid web is then formed from the cement-borated asbestos fiber slurry by filtering off a major portion of the water of the slurry so that the fiber and cement are deposited to form a continuous solid wet sheet on a foraminous surface such as, for example, a water absorbent felt, a moving screen or a screen-covered perforated cylinder under a partial vacuum. The web thus formed is usually further consolidated and dewatered by applying a partial vacuum to suction rolls or felts or by pressure rolls as the web advances through the machine.

BORATED ASBESTOS FIBERS

The novel borated asbestos fibers of the present invention are useful in making cementitious composition extrusion processes and for hand moulding. Asbestos cement pipe is usually made by a process wherein a thin sheet of cementitious composition, typically collected from a dilute aqueous slurry of the components with a filter screen activated by pressure differentials, is accumulated by convolute winding on a rotating mandrel and consolidated to a continuous mass by the application of pressure. Upon completion of the forming operation of accumulation and consolidation to the designed wall thickness and density, the resultant incompletely hydrated or set asbestos cement cylindrical body comprising the pipe is removed from the forming mandrel normally as promptly as is practical for recovery and return of the mandrel for re-use, whereupon the asbestos-cement product is appropriately cured to complete its hydration.

It is common practice in the manufacture of cement asbestos products to substitute up to 30% by weight of chrysotile asbestos fiber by other naturally occurring asbestos fibers, namely, amosite (white asbestos) and particularly crocidolite (blue asbestos) which process high filtration rates to improve the filtration properties of the asbestos-cement. Crocidolite has been associated with health problems and its use in industrial applications is either banned or subject to severe restrictions. Moreover, amosite and crocidolite are in short supply.

In view of the highly improved filtration properties of the borated asbestos fiber of the present invention, there is no need or advantage in substituting part thereof in the manufacture of asbestos cement products.

Essentially, the novel borated asbestos fiber of the present invention may also be characterized by its boron content which varies from 0.05 to 5.0% by weight, and preferably from 0.1 to 0.5% by weight.

It is also another feature of the present invention that the borated asbestos fibers are opened with a Pallmann apparatus to a surface area of preferably about 12000 $cm^2/g$. The method used is that described in ASTM D-2752 involving the use of an RSA apparatus.

The method for increasing the surface area involves the use of a Pallmann apparatus. The sample is passed once through the apparatus at a constant rate of 150 g per 90 to 120 seconds so as to maintain a predetermined speed to strain the desired surface area.

The exact mechanism by which the boron is bonded to the asbestos fibers is not completely understood. It is known that the individual fibers are composed of a network of magnesium hydroxide tetrahedra. The outermost portion of the tetrahedra contains hydroxyl groups. It appears feasible that the hydroxyl hydrogens are being displaced by the boron cation to form a bond between the boron and the asbestos. Since each asbestos fiber is composed of a number of individual sheets having outer hydroxyl groups, and because these sheets are contorted into concentric scrolls, the bonding of boric acid may occur on more than just the outermost exposed surface of the asbestos fiber.

FREENESS OR FILTRATION OR DRAINAGE TEST

The freeness or speed of filtration or drainage was determined in accordance with the procedure "Freeness Test for Asbestos" described in "Testing Procedure for Chrysotile Asbestos-Method D7", 1966 edition, prepared jointly by the Asbestos Textile Institute, the Mineral Fiber Products Bureau and the Quebec Asbestos Mining Association. Essentially it is the time required to filter 100 ml of a saturated solution of calcium hydroxide and hydrated calcium sulfate containing 2% of a suspension of asbestos fiber or a suspension of the treated asbestos fiber to be evaluated.

The percent reduction in time of filtration of the treated asbestos fiber is calculated in accordance with the formula:

$$(A - B/A) \times 100$$

wherein A is the time of filtration, in seconds, of the control sample and B is the time of filtration, in seconds, of the borated asbestos fiber samples.

It is also noted that improved filtration time involves the following factors: the surface area of the starting asbestos fibers, the amount of boric acid mixed with the asbestos fibers, the temperature at which the mixture is heated and the length of time of the heating cycle.

The present invention will be more readily understood by referring to the following Examples which are given to illustrate rather than limit the scope of the invention.

EXAMPLE 1

In the following Examples, a predetermined amount of asbestos fiber and a predetermined amount of boric acid, technical grade, are throughly mixed in a rotary mixer for a period of 6 minutes. The homogenous mixture is then transferred to an oven heated at the temperature indicated in each example. Alternatively, the mixture can be moulded in an appropriate mould. The following tables show the effect of boric acid concentration, temperature and surface area on the freeness of the borated asbestos fiber prepared in accordance with the present invention.

TABLE 1

Relationship of boron content on freeness of asbestos fibers (grade 4D)*

| Weight of Asbestos (Kg) | Weight of Boric acid (g) | Boron Content % | Freeness in sec. | Improv. % |
|---|---|---|---|---|
| 3.0 | 0 | 0 | 94 | — |
| 3.0 | 8.6 | 0.05 | 60 | 36 |
| 3.0 | 17.2 | 0.1 | 27 | 71 |
| 3.0 | 34.3 | 0.2 | 21 | 77 |
| 3.0 | 51.5 | 0.3 | 18 | 80 |
| 3.0 | 68.7 | 0.4 | 17 | 81 |
| 3.0 | 85.8 | 0.5 | 14 | 85 |

*Heated at 240° C. for two hours with asbestos fibers having a surface area of 12,000 cm²/g (RSA) with Pallmann.

It will be noted that the freeness is improved when using a boron content of 0.05% with a surprising improvement where using from 0.1 to 0.5% boron.

TABLE 2

Relationship of heating temperature for a constant boron content (0.5%) on freeness of asbestos fibers (grade 4D).*

| Weight of Asbestos (Kg) | Weight of boric acid | Heating temperature | Freeness in sec. | Improvement % |
|---|---|---|---|---|
| 3.0 | 0 | 25° C. | 94 | |
| 3.0 | 0 | 105° C. | 92 | |
| 3.0 | 0 | 240° C. | 106 | |
| 3.0 | 85.8 | 110° C. | 74 | 21. |
| 3.0 | 85.8 | 155° C. | 57 | 39. |
| 3.0 | 85.8 | 175° C. | 23 | 75. |
| 3.0 | 85.8 | 200° C. | 18 | 80. |
| 3.0 | 85.8 | 240° C. | 14 | 85. |
| 3.0 | 85.8 | 280° C. | 13 | 86. |

*Heating period of two hours.

It will be noted that the temperature has no effect on the freeness of untreated asbestos fibers, but shows surprising improvement in the freeness of borated asbestos fibers as the temperature is raised from 110° C. to 280° C.

TABLE 3

Relationship of temperature of heating and boron content on freeness of asbestos fibers (grade 4D)*.

| Weight of asbestos (Kg) | Boric acid g | % boron content | Heating temper. °C. | freeness in sec. | Improv. % |
|---|---|---|---|---|---|
| 3.0 | 0 | 0 | 25 | 94 | — |
| " | 34.3 | 0.2 | 171 | 41 | 56 |
| " | " | " | 200 | 49 | 48 |
| " | " | " | 255 | 26 | 72 |
| " | " | " | 283 | 22 | 77 |
| " | 51.5 | 0.3 | 171 | 36 | 61 |
| " | " | " | 200 | 36 | 61 |
| " | " | " | 255 | 21 | 77 |
| " | " | " | 283 | 19 | 80 |
| " | 68.6 | 0.4 | 149 | 52 | 44 |
| " | " | " | 171 | 34 | 64 |
| " | " | " | 200 | 27 | 71 |
| " | " | " | 255 | 18 | 81 |
| " | " | " | 283 | 16 | 83 |
| " | 85.8 | 0.5 | 149 | 39 | 58 |
| " | " | " | 171 | 25 | 73 |
| " | " | " | 200 | 22 | 76 |
| " | " | " | 255 | 17 | 82 |
| " | " | " | 283 | 14 | 85 |

*Heating 2 hours with surface area of 12,000 cm²/g (RSA) with Pallmann.

TABLE 4

Relationship between boron content and time of heating on freeness of asbestos fibers (grade 4D)*.

| Weight of asbestos (Kg) | Weight of boric acid (g) | Boron content % | Heating time (min.) | Freeness in sec. | Improv. % |
|---|---|---|---|---|---|
| 3.0 | 0 | 0.2 | 0 | 94 | — |
| 3.0 | 34.3 | 0.2 | 5 | 51 | 46 |
| 3.0 | " | " | 10 | 41 | 56 |
| 3.0 | " | " | 15 | 40 | 57 |
| 3.0 | " | " | 30 | 39 | 58 |
| 3.0 | " | " | 60 | 35 | 63 |
| 3.0 | 51.5 | 0.3 | 5 | 34 | 64 |
| 3.0 | " | " | 10 | 29 | 69 |
| 3.0 | " | " | 15 | 29 | 69 |
| 3.0 | " | " | 30 | 27 | 71 |
| 3.0 | " | " | 60 | 27 | 71 |
| 3.0 | 68.7 | 0.4 | 5 | 27 | 71 |
| 3.0 | " | " | 10 | 22 | 76 |
| 3.0 | " | " | 15 | 28 | 70 |
| 3.0 | " | " | 30 | 23 | 75 |
| 3.0 | " | " | 60 | 20 | 78 |
| 3.0 | 85.8 | 0.5 | 5 | 29 | 69 |
| 3.0 | " | " | 10 | 21 | 77 |
| 3.0 | " | " | 15 | 22 | 76 |
| 3.0 | " | " | 30 | 22 | 76 |
| 3.0 | " | " | 60 | 29 | 69 |

*Heating at 240° C. with a surface area of 12,000 cm²/g (RSA) with Pallmann.

TABLE 5

Relationship of surface area on freeness of borated asbestos fibers.

| Weight of asbestos (Kg) | Weight of boric acid (g) | Boron content % | Surface area cm²/g | Freeness in sec | Improv. % |
|---|---|---|---|---|---|
| 3.0 | 0 | 0 | 12000 | 94 | — |
| 3.0 | 8.6 | 0.05 | 12100 | 48 | 49 |
| 3.0 | 17.2 | 0.1 | 12000 | 45 | 52 |
| 3.0 | 34.3 | 0.2 | 12100 | 29 | 69 |
| 3.0 | 85.8 | 0.5 | 11800 | 21 | 77 |
| 3.0 | 0 | 0 | 18500 | 142 | — |
| 3.0 | 9.6 | 0.05 | 18100 | 125 | 12 |
| 3.0 | 17.2 | 0.1 | 17500 | 107 | 25 |
| 3.0 | 34.3 | 0.2 | 17700 | 85 | 40 |
| 3.0 | 85.8 | 0.5 | 17700 | 72 | 49 |
| 3.0 | 0 | 0 | 14400 | | — |
| 3.0 | 8.6 | 0.05 | 13800 | 66 | — |
| 3.0 | 17.2 | 0.01 | 14400 | 68 | — |
| 3.0 | 34.3 | 0.2 | 14400 | 52 | — |
| 3.0 | 85.8 | 0.5 | 14400 | 37 | — |
| 3.0 | 0 | 0 | | | |
| 3.0 | 8.6 | 0.05 | 15500 | 78 | |
| 3.0 | 17.2 | 0.1 | 16100 | 93 | |
| 3.0 | 34.3 | 0.2 | 16000 | 66 | |

TABLE 5-continued

Relationship of surface area on freeness of borated asbestos fibers.

| Weight of asbestos (Kg) | Weight of boric acid (g) | Boron content % | Surface area cm²/g | Freeness in sec | Improv. % |
|---|---|---|---|---|---|
| 3.0 | 85.8 | 0.5 | 15800 | 56 | |

Heating at 240° C. for 2 hours opening with a Pallmann

TABLE 6

Relationship between fibre grade and freeness.

| Grade | Weight of asbestos fibers (Kg) | Weight of boric acid (g) | Freeness in sec. | Improvement % |
|---|---|---|---|---|
| AX | 3.0 | 0 | 100 | — |
| AX | 3.0 | 77 | 24 | 76 |
| 4T | 3.0 | 0 | 139 | — |
| 4T | 3.0 | 77 | 23 | 84 |
| 4K | 3.0 | 0 | 78 | |
| 4K | 3.0 | 77 | 18 | 77 |
| 6D | 3.0 | 0 | 214 | — |
| 6D | 3.0 | 69 | 47 | 78 |

All fibers had a surface area of 12000 cm²/g (RSA) Pallmann. It is noted that all grade of borated asbestos fibers showed a material increase in freeness when compared to untreated asbestos fibers.

The binding of the boric acid to the asbestos fibers is characterized by having a BET surface area value of less than 26.4 BET surface mg²/gr as determined by measuring the nitrogen accessible surface area values of untreated asbestos fibers and borated asbestos fibers having various boric acid contents (heated at 200° C. for 45 minutes) by the BET method on a Quanto-chrome QS10 apparatus. Results are shown in the following table.

| Boric acid content | BET surface m²/gr |
|---|---|
| 0 | 26.4 |
| 1.8 | 22.5 |
| 3.5 | 20.2 |
| 6.8 | 15.3 |
| 14.4 | 13.7 |

The method for measuring nitrogen accessible surface areas is described in J. Am. Chem. Soc., 1938, 60, pp. 309–319.

We claim:

1. A process for preparing borated asbestos fibers which comprises heating a homogeneous dry mixture consisting essentially of asbestos fibers and boric acid to a temperature of from 100° to 350° C. for a period of from 0.05 to 2.00 hours such that bonds are formed between the boric acid and the asbestos fibers.

2. A process according to claim 1, wherein the amount of boric acid is from 0.286 to 28.6% by weight of asbestos fibers and after the heating step there is obtained borated asbestos fibers having a boron content of from 0.05 to 5.00% by weight.

* * * * *